United States Patent
Tapper et al.

(10) Patent No.: US 9,576,268 B2
(45) Date of Patent: Feb. 21, 2017

(54) DISTRIBUTED DATA ANALYSIS

(75) Inventors: Gunnar D. Tapper, Florissant, CO (US); David W. Birdsall, Santa Clara, CA (US); Gary M. Gilbert, Arlington Heights, IL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1874 days.

(21) Appl. No.: 12/548,198

(22) Filed: Aug. 26, 2009

(65) Prior Publication Data

US 2011/0055158 A1    Mar. 3, 2011

(51) Int. Cl.
*G06F 17/30* (2006.01)
*G06Q 10/10* (2012.01)
*G06Q 30/02* (2012.01)

(52) U.S. Cl.
CPC .......... *G06Q 10/10* (2013.01); *G06Q 30/02* (2013.01)

(58) Field of Classification Search
CPC ........ G06Q 10/10; G06Q 30/02; G06Q 40/04; G06Q 10/107; G06F 9/546; G06F 2201/86; G06F 15/16; G06F 17/30; H04L 67/327; H04L 41/0213; H04L 41/0604; H04L 43/10; H04L 67/20; H04L 12/1859; H04L 41/0672; H04L 41/5041; H04L 67/2852; H04L 2209/60; H04L 47/11; H04L 47/15; H04L 47/822
USPC ........ 707/627, 736, 754, 756, 776, E17.032, 707/E17.044, E17.108; 709/223; 719/318

See application file for complete search history.

(56) References Cited

U.S. PATENT DOCUMENTS

| | | | |
|---|---|---|---|
| 5,838,918 A | 11/1998 | Prager et al. | |
| 5,867,799 A * | 2/1999 | Lang et al. | |
| 5,995,945 A | 11/1999 | Notani et al. | |
| 6,148,298 A * | 11/2000 | LaStrange et al. | |
| 6,202,093 B1 * | 3/2001 | Bolam et al. | 709/225 |
| 6,636,860 B2 * | 10/2003 | Vishnubhotla | 707/600 |
| 6,687,693 B2 * | 2/2004 | Cereghini et al. | 707/602 |
| 6,944,662 B2 * | 9/2005 | Devine et al. | 709/225 |
| 6,968,355 B2 * | 11/2005 | Baldwin et al. | 709/201 |
| 7,165,105 B2 * | 1/2007 | Reiner et al. | 709/224 |
| 7,231,398 B2 * | 6/2007 | Schlereth et al. | |
| 7,406,537 B2 * | 7/2008 | Cullen | 709/238 |
| 7,487,550 B2 * | 2/2009 | Todd | 726/27 |
| 7,606,818 B2 * | 10/2009 | Bachmann et al. | |
| 7,730,019 B1 * | 6/2010 | Graham | |

(Continued)

OTHER PUBLICATIONS

Park and H. Kargupta. Distributed Data Mining: Algorithms, Systems, and Applications. In N. Ye, editor, Data Mining Handbook. 2002.*

*Primary Examiner* — Evan Aspinwall
(74) *Attorney, Agent, or Firm* — Trop, Pruner & Hu, P.C.

(57) ABSTRACT

Distributed data analysis systems and methods are provided. A data broker distributes received data to consumers, such as information and repository consumers, which can be subscribed to the data. A subsystem with a processor for data processing can provide data to the data broker. A first information consumer may include a receiving module for receiving the data from the data broker, an analysis module for analyzing the received data to obtain a result, and a publication module for sending the result to the data broker when a second information consumer is subscribed to the result.

18 Claims, 3 Drawing Sheets

(56) References Cited

U.S. PATENT DOCUMENTS

| | | | |
|---|---|---|---|
| 7,730,024 B2* | 6/2010 | Harinath | G06F 21/6227 |
| | | | 707/608 |
| 7,747,569 B2* | 6/2010 | Comi et al. | 707/610 |
| 7,822,801 B2* | 10/2010 | Zhao | G06Q 10/10 |
| | | | 709/201 |
| 2005/0223021 A1* | 10/2005 | Batra et al. | 707/102 |
| 2005/0268146 A1* | 12/2005 | Jin | G06Q 40/04 |
| | | | 714/2 |
| 2007/0088711 A1* | 4/2007 | Craggs | G06Q 10/10 |
| 2008/0104008 A1* | 5/2008 | Brantley et al. | 707/1 |
| 2008/0109513 A1* | 5/2008 | Fishhaut et al. | 709/203 |
| 2008/0209564 A1* | 8/2008 | Gayde | G06F 21/50 |
| | | | 726/25 |
| 2009/0099852 A1* | 4/2009 | Ouimet | 705/1 |
| 2009/0140035 A1* | 6/2009 | Miller | 235/375 |
| 2009/0157460 A1* | 6/2009 | Narayanaswamy | 705/8 |
| 2009/0187635 A1* | 7/2009 | Lobban | G06Q 10/10 |
| | | | 709/206 |

* cited by examiner

DISTRIBUTED DATA ANALYSIS

BACKGROUND

Business organizations often rely on various kinds of data in operating a business and in making business decisions. Increasingly, the data relied on is stored in some form of database or data warehouse. Businesses may desire to store the data for reasons such as increasing productivity, forecasting business trends, providing new business opportunities, or any other of a myriad of business reasons.

Through business operations, large sets of data can be accumulated and managed by businesses. However, the amount of data can become large enough that data management becomes a difficult and complex task. Tasks such as sorting or searching through data may use increasing computing resources and time to complete. Sifting through data to find useful information can be a challenge for businesses.

Frequently business data may be stored electronically in databases. When a number of records in a database rise to a sufficiently large amount, simply sorting the information in a database can provide little meaningful results and businesses may struggle to make efficient use of the tremendous amount of information in databases. While statistical analysis of the records in a database may yield useful information, such analysis may be performed best by persons with advanced training in math or computer science that are able to understand the results of the analysis. Additionally, translation of the statistical analysis of the information in a large database into a form that may be useful for such activities as marketing can also be difficult. Such a situation may prevent the effective use of the information in a database and preclude the use of a possible valuable resource.

Stored data can also be used to analyze software, hardware, and application problems, but a large amount of data can make such an analysis overwhelming. Trying to gather all the data needed to determine whether a problem exists, the nature of the problem, and how to repair the problem can result in software and other solutions that can be extremely complex in nature. Problems, errors, and failures in a computing system can result in incomplete or incorrect data or analysis. Businesses desire to be able to more effectively and efficiently manage and analyze data, as well as databases, and computing resources which may be utilized in the management or analysis of the data. Businesses also desire to be able to better utilize data relating to problem analysis and be able to provide for recovery from failures or errors.

DETAILED DESCRIPTION OF EXAMPLE EMBODIMENT(S)

Figure 1:
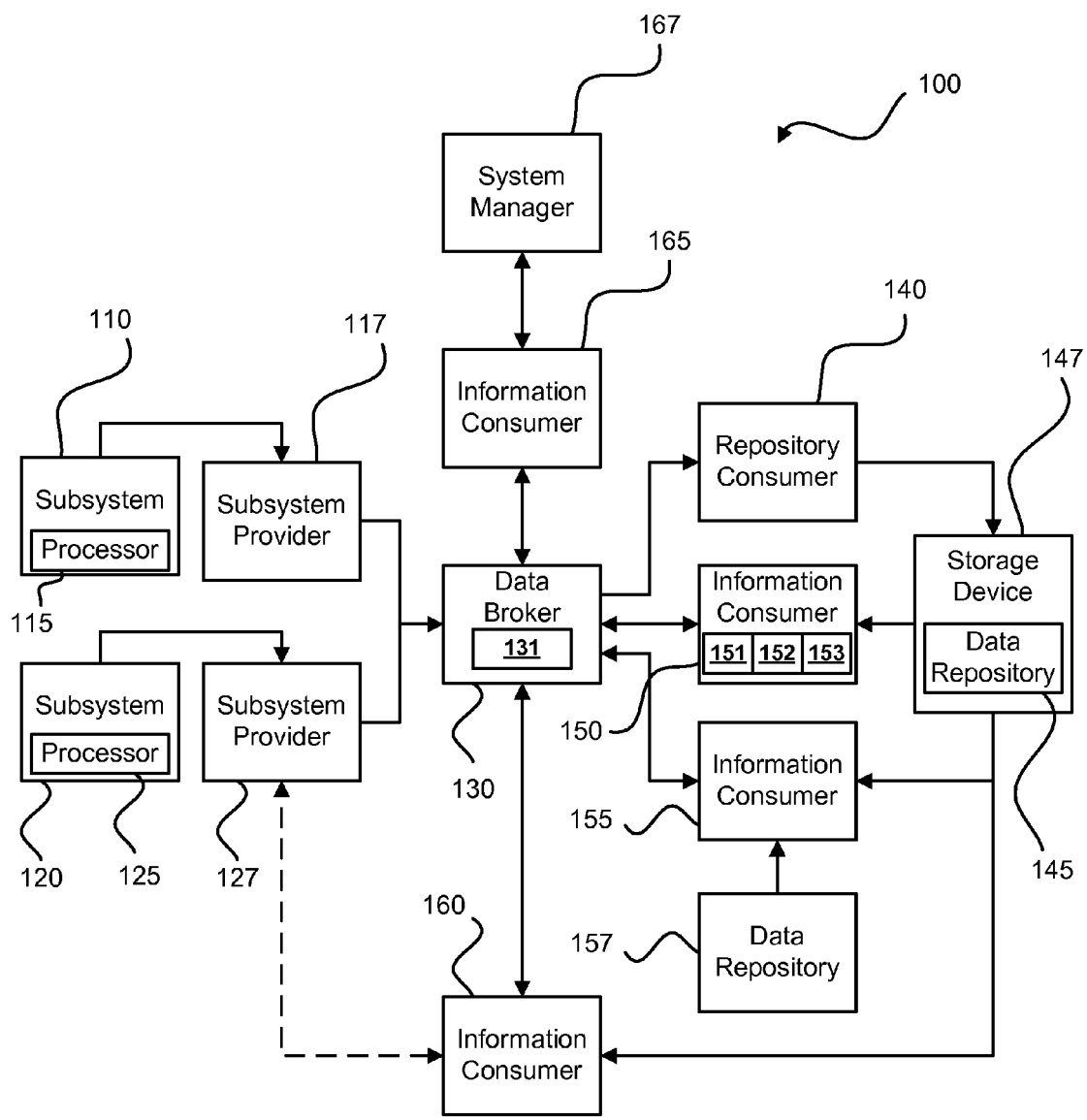
FIG. 1 is a block diagram of a distributed data analysis system in accordance with an embodiment.

Reference will now be made to the exemplary embodiments illustrated, and specific language will be used herein to describe the same. It will nevertheless be understood that no limitation of the scope of the invention is thereby intended. Additional features and advantages of the technology will be apparent from the detailed description which follows, taken in conjunction with the accompanying drawings, which together illustrate, by way of example, features of the technology.

As computer systems grow into large clusters, managing data needed to analyze software, hardware, and application problems can become a significant task. For example, gathering enough data to pinpoint whether a problem exists, what the problem is, and how to repair the problem when dealing with large volumes of data can result in software and databases that can be resource intensive and complex in nature. Traditional data analysis solutions often have each problem analysis engine examine raw data using interfaces particular to the raw data. In other words, a particular set of raw data and a particular analysis engine may be configured to work together, but the particular set of raw data may not necessarily be compatible with a different analysis engine, and a different analysis engine may not necessarily be able to process data other than a particular set of raw data. Also in prior solutions, results determined by different analysis components may not be available to the current analysis component. In some existing products, a user can design a data flow for processing sets of data. The data flow may be made up of operators and the flow is generally deployed as a unit. The flow is static in the sense that operators cannot be simply added or removed. An interface between the operators is generally fixed to one kind of data. Data flows do not interact and any changes to a part of the flow results in an entire repackaging and redeployment of the whole flow.

Furthermore, prior data analysis methods have had shortcomings including not accommodating unforseeability, failures, filtering, etc. System designers and programmers cannot always foresee what functions may be needed in the future. Some problem analysis can benefit from a combination of information from several unrelated sources. Advanced problem analysis can often be better performed when input data is filtered, but in prior data analysis solutions, the volume of raw data to be processed may often be too large.

For effective analysis, the analysis of data can be broken down in to simple components where each component may be specialized. This can be beneficial both from a problem containment perspective as well as from a scalability perspective. Furthermore, analysis of data may be more efficiently performed when a certain degree of system failure or data loss caused by a system failure can be accommodated for. For example, data loss may be acceptable when the loss can be detected which allows a system to perform recovery operations.

Accordingly, distributed data analysis systems and methods are described in this description. A data broker distributes received data to consumers, such as information and repository consumers, which can be subscribed to the data. The data can be anything in a form suitable for use with a computing system. For example, data can refer to numbers, letters, statistics, graphs, images, measurements, observations, a set of variables, etc. In one aspect, data may be information organized for analysis, or a collection of facts from which conclusions can be drawn. A subsystem with a processor for data processing can provide first data to the data broker. A first information consumer may include a receiving module for receiving the first data from the data broker, an analysis module for analyzing the received first data to obtain a result, and a publication module for sending the result as second data to the data broker when a second information consumer is subscribed to the second data. A "subscription" can refer to a computing component being registered or "signed up" to receive data or copies of data from another computing component, such as the data broker. A repository consumer can receive data from the data broker and store the received data in a data repository. A computer readable storage medium can be used to store the data repository.

The data analysis systems and methods presented herein can separate a process for collecting data from data analysis. Analyzed data can be used as another form of raw data which can allow further analysis of that analyzed data at any arbitrary number of levels. Additionally, analyzed data generally includes less data than the original raw data which was analyzed. In this manner, distributed problem analysis can be scaled to large volume data processing while providing extensibility for usage not foreseen when raw data is first captured and first analysis processes are developed. Additional analysis components can be added without making changes to other components which provide raw data or to components which perform other analysis. Each analysis engine can provide results in a format identical or similar to data formats received from components providing raw data. Analysis components can use previously analyzed results or raw data or any combination thereof. Using previously analyzed results for further analysis can reduce an amount of data to be analyzed, filtered, etc. which can enhance a system's ability to quickly provide additional analysis or make decisions rather than having to re-analyze large volumes of data. In accordance with an embodiment, the data analysis can use a subscription-based provider/consumer model where publications of data are separated from consumers using a data broker that allows dynamic subscription of published information.

As illustrated in FIG. 1, a system for distributed data analysis in accordance with an embodiment is indicated generally at 100. A subsystem 110, 120 can represent a function or device to be managed. The subsystem may comprise any form of hardware or software, such as a device or an application function. The subsystem can support a programmatic interface for command and/or control and the subsystem may also be configured to communicate notifications of event errors. In one aspect, the subsystem can include a processor 115, 125 such as may be provided in the case of hardware. In another aspect, the subsystem may comprise a system function and can be in communication with a processor which is integrated with or separate from the subsystem.

The subsystem may comprise any suitable subsystem as known in the art. Some examples of subsystems follow. The subsystem may comprise a transaction management subsystem which can ensure that database updates are done atomically, consistently, durably, and in isolation. The subsystem may comprise a disk subsystem which can manage physical disk devices. The subsystem may comprise a messaging subsystem which can transport messages between nodes in a cluster. The subsystem may comprise a database management subsystem which can be used to implement query languages (such as Structured Query Language (SQL)) and persistent storage of data. Subsystems can be layered on top of one another. For example, the database management subsystem can rely on services of the transaction management subsystem, the disk subsystem, and the messaging subsystem. Similarly, the transaction management subsystem can rely on the disk and messaging subsystems.

The system can be configured to fit any of a variety of different technologies and usages. For example, the system may be used in data analysis associated with web-based applications, network monitoring, management of customer data, and virtually any other type of application in which analysis of data is desirable.

A data broker 130 can receive data from subsystem providers 117, 127 and send the data to subscribing information consumers. The data broker can also perform message sequencing and detection of lost data. For any given implementation, there may be one or more data brokers. A data broker's application programmatic interface (API) can allow a client (such as a subsystem or an information consumer) to send data to the data broker and/or receive data from the data broker. The API can handle issues such as "box carring" (packaging multiple data arrays into a single buffer and sending the buffer either when the buffer becomes full or when a timer expires), endianism, and communication protocols.

Information providers 117, 127 can send state data, statistical data, and usage data regarding the subsystems and/or functions to the data broker via the data broker API for distribution. An information provider can be a subsystem that publishes or sends data to the data broker using the data broker API. In one aspect, the information providers can be a part of the subsystem 110 or 120. In another aspect, the processor 115 125 may be the information provider.

Information consumers 150, 155, 160, 165 can subscribe to receive data distributed by the data broker 130 and can receive and unpack the data using the data broker API. Information consumers can receive data using a receiving module 151 and perform a function or analysis on the data using an analysis module 152. For example, an information consumer can perform an analysis of data received from the data broker and publish or send the result of the analysis back to the data broker using a publication module 153. The result of the analysis can be sent as a new form of data for other information consumers to obtain and act upon. In addition to analysis, information consumers can also perform functions such as visualization, statistical analysis, data storage, and many forms of actions thereby allowing a very flexible processing of data flowing through the system.

Information consumers do not necessarily need to know a source of data, and when performing abstractions on data previously analyzed or otherwise acted upon by other consumers. The original raw data is not necessarily important to analysis of the data by the current information consumer as long as the meaning of the current data is clear. In one aspect, information consumers may be configured to always publish results or analyzed data to the data broker. In another aspect, information consumers may be configured to selectively publish results to the data broker. For example, an information consumer can receive notification from the data broker when there are no subscribers to the results, and in this case the information consumer can dynamically determine to not publish results to the data broker. As another example, a system administrator may not wish for certain data or results to be published regardless of whether other information consumers are subscribed to receive the results. The information consumer can determine whether the results match the data or type of data which the system administrator does not wish to have published and can determine to not publish the data.

In yet another aspect, the data broker may be configured use a notification module 131 to notify an information consumer either when there is another information consumer subscribed to receive the results or when there is no other information consumer subscribed to receive the result. The information consumer can then dynamically determine to publish the results, or alternatively to not publish the results.

Information consumers can also be information providers. For example, when an information consumer has received and transformed or analyzed data from the data broker, then the results of an analysis on the data can be published back to the data broker and the information consumer is acting as both an information consumer and an information provider. Thus, a consumer can be a provider and vice-versa. An information consumer can be in communication with, related to, or formed as a part of a subsystem in the same manner as a provider and a subsystem are related. To prevent infinite loops of data flowing through a data broker, the system may be configured such that a particular information consumer cannot also be a provider for a same set of data. For example, a particular information consumer provider might consume (analyze, process, subscribe to, etc.) a set of data and publish the data which meets one or more criterions. The contents of individual data within the data set may be identical but the published data may be only a subset of the consumed data. This may be allowable as the results differ from the source.

One form of information consumer may be a repository consumer 140. A repository consumer may be an information consumer which is configured to receive data from the data broker 130 and then place the data in a data repository 145. The data repository may be a database, data warehouse, or other form of data storehouse. The data repository can be stored on a computer readable storage medium, such as hard disk drive, for example. Any other form of computer readable storage medium may also be used. Some other examples include flash storage devices, optical media, etc. The data repository may be accessible by one or more information consumers 150, 155. The information consumers can retrieve data in the data repository for analysis or other functions. Generally, a repository information consumer will not publish or send data to the data broker, but only to the data repository. However, in one aspect, the repository information consumer may also be configured to publish data to the data broker. For example, at a time when a particular set of data is distributed by the data broker, a particular information consumer may be waiting to process the data but may be configured to process the data only after a different set of data is processed. The information consumer could pull the data from a data repository, or the repository consumer could be configured to re-publish the earlier published data for the information consumer. In one aspect, the re-published data may be re-published to a different subscription in order to avoid potential infinite loop issues. The repository consumer can publish the data such as at particular time intervals or after receiving the results of the later analyzed data for which the information consumer had been waiting.

The repository consumer can use the data broker API to receive and send data. Data received by the repository consumer can be raw data from a provider, or may be analyzed data from an information consumer. The repository consumer can subscribe to receive data from various providers and/or consumers. In one aspect, all the data from providers and/or consumers may be stored in the data repository. In another aspect, only selected data may be stored in the data repository, and the selection can be handled through the subscription model.

An intermediate process that interacts with a subsystem to obtain data may be used for subsystems that are not instrumented. In one aspect, subsystem providers 117, 127 can provide the intermediate processing. The intermediate process can use the data broker API to forward data to the data broker. Generally, a number of information consumers interested in or subscribed to data from a subsystem or provider may not be important information to an information provider. Furthermore, whether the information consumers are currently active may also be unimportant information to the information provider.

An example implementation of the system 100 will now be described in a troubleshooting scenario. One or more subsystems 110, 120 or information providers 117, 127 may be running a function. The function may be an SQL query executing within a relational database management subsystem. Data about the SQL query's performance characteristics may be sent to one or more data brokers 130 as raw data. The raw data can be sent to a repository consumer 140 to be deposited in a data repository 145. The raw data may also be sent to a graphical user interface (GUI) at least in a filtered form to provide display information to a user. The GUI may subscribe to receive data from the data broker in a same manner as an information consumer subscribes to data. In one aspect, the GUI is an information consumer 165. The GUI may be any form of command interface, textual display, blinking lights, etc. which can be used to provide information to a user 167 (referred to on FIG. 1 as the System Manager. The System Manager may be a human, as in this scenario, or may be a form of hardware or software used for managing subsystems, consumers, providers, or other elements of the system. The System Manager does not need to interface with a GUI and may receive data or results from any form of information consumer).

The raw data may also be sent to a threshold consumer (an information consumer) 150. The threshold consumer may analyze the query data to determine whether a query has been running for too long. If the threshold consumer determines that the query has been running for too long, the threshold consumer may send a threshold violation to the data broker. The threshold violation can be sent to a repository consumer and stored in the data repository. The threshold violation may also be sent to the GUI which can notify the user, such as through an alert window, that a threshold has been violated. The threshold violation can also be sent to a problem consumer.

The problem consumer 160 may perform an analysis of the query in an attempt to determine why the query is running too long. For example, the problem consumer may pull information from the data repository to discover information about the query, such as query loads, priority, etc. The problem consumer may also query the subsystem running the query or another subsystem or provider 127 which may supply information about the query. The problem consumer may use a structured query language (SQL) and a low-level API to communicate with the subsystem.

After the problem consumer has analyzed the query, if a real problem exists, the problem consumer can publish the results of the analysis to the data broker. The data broker may again send the problem information to a repository consumer to be stored in a data repository and to a GUI consumer to display that a problem has been identified. The data broker may also send the problem information to a repair consumer 155 which may be subscribed to receive problem data. The repair consumer can be configured to repair an identified problem. The repair consumer may be in communication with a repair action data repository 157, which may be a second, different data repository from the data repository used by the repository consumer. The repair consumer can identify a repair action suited for repairing a particular problem and publish the repair action to the data broker. For example, the repair action might be to kill queries holding database locks.

The data broker can send the repair action to a GUI, to the repository consumer for depositing in the data repository, and to another consumer, such as an automation consumer. The automation consumer can analyze the repair action and determine whether or not the repair should be executed. If the automation consumer determines that the repair action should be executed, an instruction to execute the repair can be published to the data broker. The data broker may send the instruction to the repository consumer for depositing in the data repository. The instruction may be sent to the GUI which may or may not require user interaction. For example, the system may ask the user to invoke repair execution before invoking the repair execution. As an alternative example, a report may simply be provided to the user that a repair execution decision has been made. The data broker may also send the repair execution instruction to an execution consumer. The execution consumer may use SQL or an API to take the corrective action. The execution consumer may monitor whether the corrective action has been completed and then report or publish the results to the data broker. The data broker may then send the execution result to the GUI and to the repository consumer for storing in the data repository.

Any number of variations to the above described problem analysis flow may be conceived. For example, the consumers were described as publishing results when a problem, repair action, etc. were identified. However, the results may also be published when a problem is not identified, when a repair action is not going to be taken, etc. The process may be made simpler by reducing a number of consumers to analyze and correct a problem, or may be made more complex. For example, any number of additional consumers may be added into the flow. The additional consumers may subscribe to the same data or subscribe to different data. In one example, after the problem consumer sends the problem identification to the data broker, the data broker may send the problem to:
 a problem trend consumer which can report back how often the problem occurs;
 a query management consumer (which may be in communication with a query manager) which can determine that when certain problems occur the queries should be slowed down; and
 a notification consumer which could interface with enterprise management tools and issue a simple network management protocol (SNMP) trap to provide enterprise-wide problem notification.

These consumers can be provided in addition to the GUI, repository, and repair consumers previously described. Each of the consumers may provide feedback or reports back to the data broker. These reports can be stored in the data repository or may be provided to the GUI consumer, or even back to the problem consumer or any other consumer to which the information may be useful. Further, additional data repositories, subsystems, system management devices, or any other form of consumer, provider, device, etc. may be added to the system as may best suit a particular application.

As another example, the system 100 may be used for data loss handling. A messaging protocol or messaging infrastructure can be implemented in the subsystems. Using a messaging layer for communication between system components can result in the system being platform independent. The messaging protocol may use sequence numbers when sending data from the subsystem to the data broker. If, for example, raw data is lost due to a timeout or other failure, and does not reach the data broker, data loss will be indicated to the data broker on a next successful data transfer because the data will be out of sequence. The data broker can signal the GUI that data has been lost. The data broker can also signal data loss to a threshold consumer. The threshold consumer can analyze the loss to determine whether the lost data should be recovered or not. When the lost data should be recovered, the threshold consumer, or another consumer, may recover the data from the subsystem through ad hoc means, such as via a direct subsystem call.

As another example, the system 100 may be used for refining a larger amount of data into a smaller amount of data. For example, a large set of data may include product sales information for a business. One or more information consumers can analyze the product sales information to determine product sales within a given time period (e.g., a day (January $1^{st}$), a month (January), a year (2009), etc.) and publish the result either for use by another information consumer in further refinement or analysis or for storage in the data repository. The same or a different information consumer can analyze the product sales information for other refinements such as by product type, product model number, customer identification, or regional sales volume, etc. In one aspect, each refinement (e.g., a refinement by product model number) can be a further refinement of an earlier refinement (e.g., a refinement by time period). These refinements may be useful by another information consumer or a business analyst at the time a result is reached, or at some future time. Storing the results in a format that can later be reprocessed similar to raw data can reduce system and processing costs because the system may only process a relevant refined data set without reprocessing the entire data set.

The systems and methods for distributed data analysis assume that there will be failures in the system and that data may be lost. Since the data broker is capable of detecting that messages have been lost and can communicate that fact to information consumers, the information consumers are able to initiate recovery processing. Recovery processing can pull information about the specific objects for which information was lost. As a result of particular system failures, data may not be able to be sent to the repository consumer and/or the data repository, or even may not be able to be sent to the data broker. In this example, the system may resend the original data after the system failure has been resolved, or may simply ignore the loss of data, or may subscribe to receive and store data from an information consumer after the original data has been processed. In the latter example, at least some of the original data or results from processing of the original data may be preserved without having to either lose the data or use additional system resources to recover the original data. The system may be configured to dynamically determine how to respond to data failure, wherever the point of failure or loss of data originates.

Data flow for the distributed data analysis systems and methods can be based on a push model. In other words, data can be published as the data becomes available and interested consumers subscribe to the published data. In a push model, interesting events (create, deletion, growth, usage statistics, etc) can be published on an as-needed basis. Thus, high-activity files, processes, etc. can cause data to be published while dormant processes, etc. may rarely cause data to be provided. Further, if a dormant process suddenly became a high-activity process, then data can begin to be published. This can allow for a very flexible and dynamic management system. Use of a push model can reduce use of system resources and make the system more manageable. Further, the push model can allow focusing on processing of objects that see high activity (as opposed to treating all objects as equal, which can be a source of various problems in a pull model).

In a pull model, there may be no way to determine what files or functions are seeing high activity and what files are more or less dormant. Further, in a pull model, all files or processes may be checked on a periodic basis since activity in between pull intervals may be difficult to predict. Perhaps even more significantly, a pull model can use system resources and interfere with a providers' capacity to perform a function. Often, providing state, statistical, and usage data for problem analysis can be ancillary to a primary provider function. A pull model may involve servicing requests for state, statistical and usage data by the provider at times determined by a client rather than at times convenient for the provider.

Even using a push model, there may be some scenarios in which data is pulled from the system. Initial discovery is one such example. When management of a new object type begins, the system may attempt to detect all objects of that type. This detection can involve software inventory of these objects (or in other words, the detection, can involve pulling information). The software may be configured to publish detected objects in a form that localizes the pull to the inventory function. Recovery may be another instance in which data is pulled, as has been described above.

In accordance with one embodiment, configuration changes can be treated as just another form of data. This can allow any function or consumer to which a configuration change is applicable to subscribe to the configuration change in a same manner as the function subscribes to other data. Alternatively, consumers can subscribe to arrival or removal of information consumers or information providers in the system.

Figure 2:
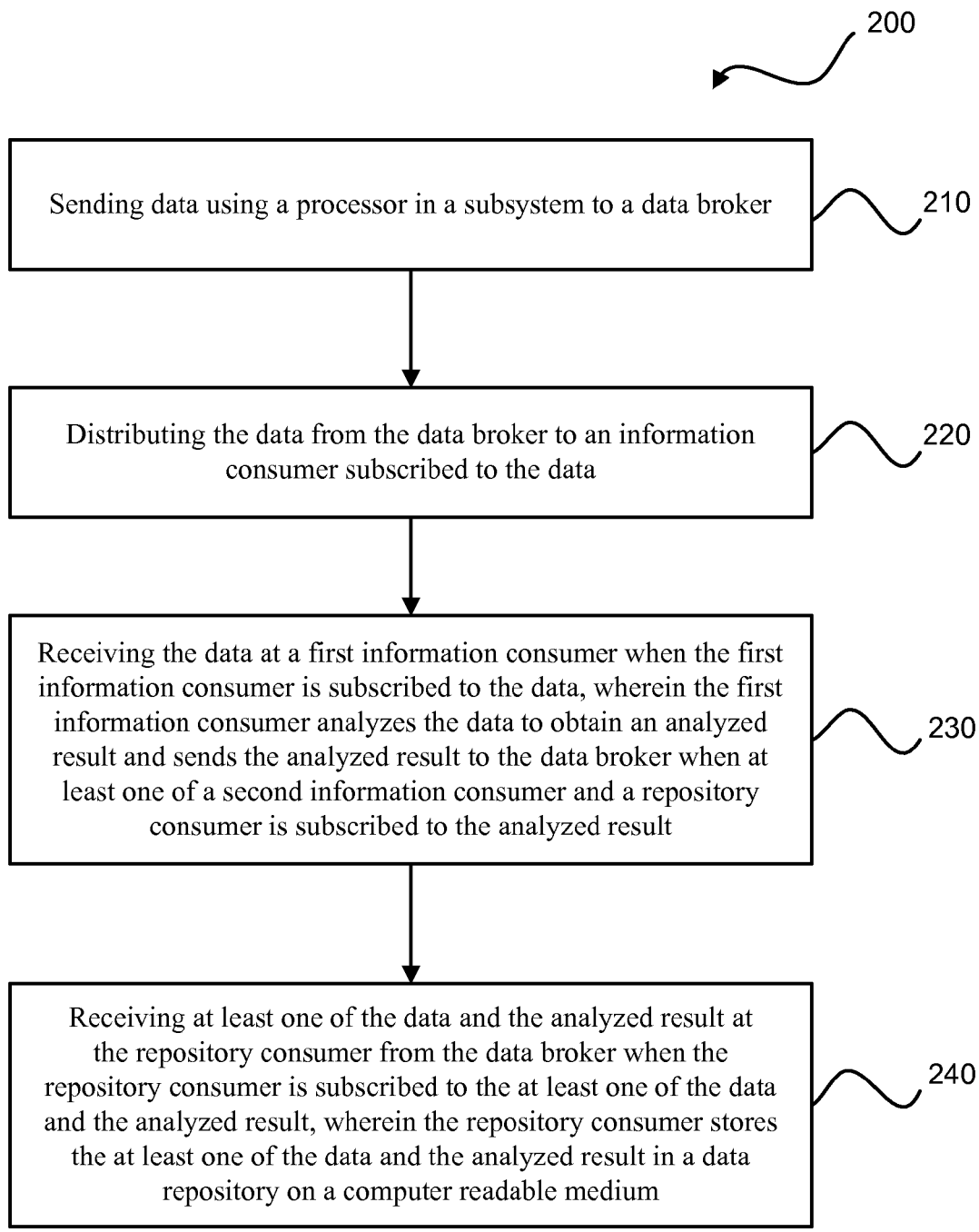
FIGS. 2-3 are flow charts of methods for distributed data analysis in accordance with embodiments.

Referring to FIG. 2, a method 200 for distributed data analysis using a computing system is provided in accordance with an embodiment. First data may be sent 210 to a data broker using a processor in a subsystem. An information provider can provide data from the subsystem to the data broker. The first data can be distributed 220 from the data broker to at least one information or repository consumer subscribed to the data. The first data can be received 230 at a first information consumer when the first information consumer is subscribed to the first data. The first information consumer can analyze the first data to obtain a result and send the result to the data broker as second data when at least one of a second information consumer and a repository consumer is subscribed to the second data. At least one of the first data and the second data can be received 240 at the repository consumer from the data broker when the repository consumer is subscribed to the at least one of the first data and the second data. The repository consumer can store the at least one of the first data and the second data in a data repository on a computer readable storage medium. In one aspect, multiple consumers which are subscribed to the same data (e.g., the second information consumer and the repository consumer) can receive the data in parallel.

Figure 3:
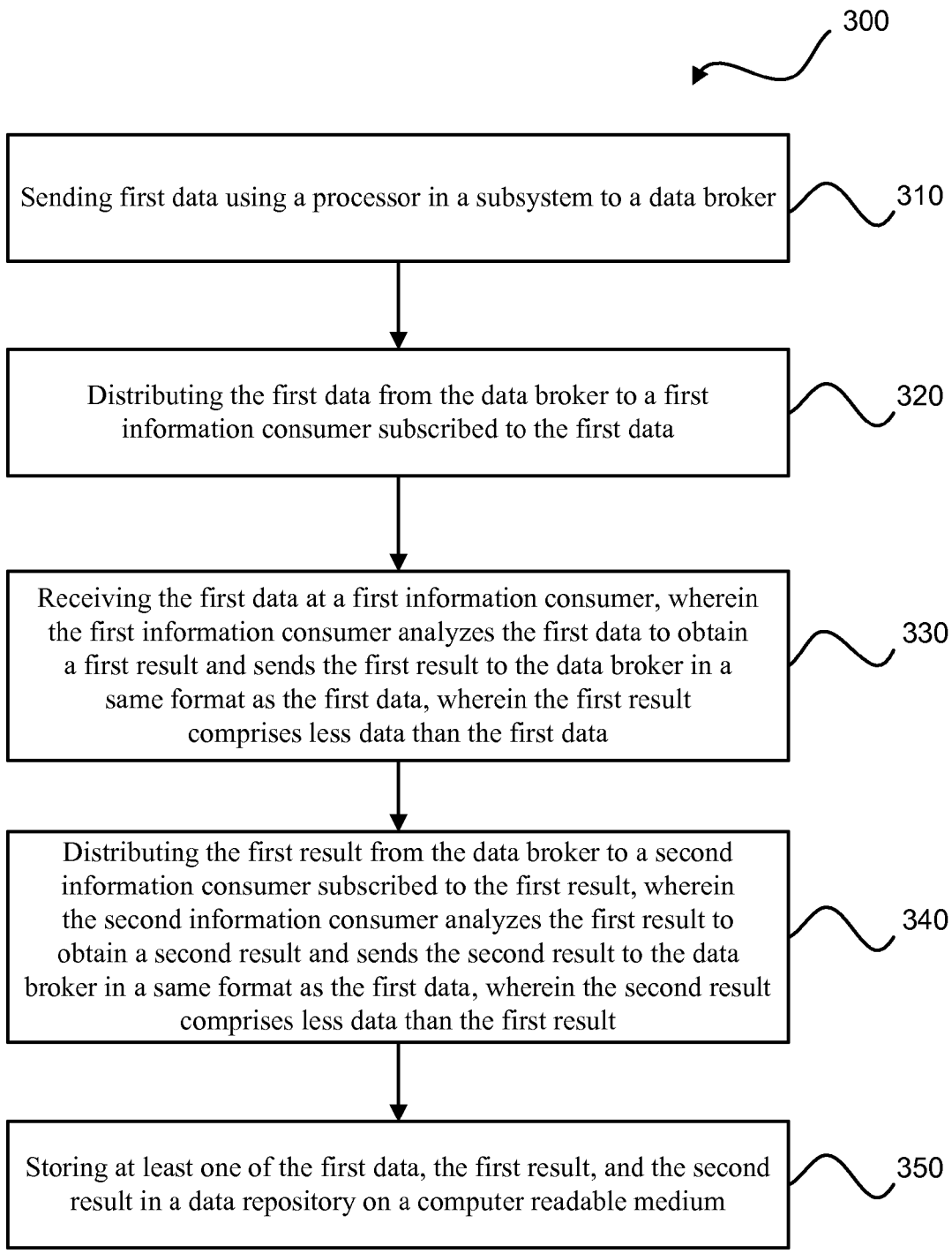

Referring to FIG. 3, a method 300 for distributed data analysis using a computing system is provided in accordance with an embodiment. First data can be sent 210 to a data broker using a processor in a subsystem. As has been described, an information provider may be the actual provider of data to the data broker from the subsystem. The first data can be distributed 220 from the data broker to a first information consumer subscribed to the first data. The first data can be received 230 at a first information consumer. The first information consumer can analyze the first data to obtain a first result and send the first result to the data broker as second data in a same format as the first data. The first data may be raw data and may be in a raw data format, and thus the second data may also be in a raw data format. The second data can comprise less data than the first data. The second data can be distributed 240 from the data broker to a second information consumer subscribed to the second data. The second information consumer can analyze the second data to obtain a second result and send the second result to the data broker as third data in a same format as the first data. The third data can comprises less data than the second data. At least one of the first data, the second data, and the third data can be stored 250 in a data repository on a computer readable storage medium.

The providers, consumers, data brokers, subsystems, etc. described herein can be implemented with virtually any computing system. Messaging subsystems often include a fabric connecting multiple nodes. However, messaging between processes may also be performed within a single node. Disk subsystems may generally include a disk storage of some sort. This disk storage may be a mechanical disk, a solid state memory cell, or any other known form of disk storage.

Using information consumers to publish a result of an analysis and/or action back to a data broker can allow other information consumers to subscribe to the analysis/action and result in a scalable architecture where analysis/action can be performed upon previously (and separately) performed analysis and/or action to any arbitrary number of levels. No strict hierarchy is necessary or implied. Information consumers can use results published by any other information consumer as well as raw data published by information providers. Distribution of data analysis and/or actions in this manner can separate collection of potential problem data from analysis of the data. Because analyzed data may be republished (in a similar form as raw data), other analysis software is not needed for understanding the raw data. The systems and methods herein can greatly simplify a programming model for very advanced problem analysis while allowing analyzed data to be stored for later reporting and/or further analysis. The systems and methods can be used to handle enormous amounts of data from enormously large systems while keeping the analysis algorithms very simple.

Information which is republished in higher levels of analysis may typically of a summary form. In other words, analyzed or published data may be typically smaller than the original data, which lends the system to scalability. The amount of data reduction at each level of analysis can be such that data volumes are always determined by the lowest level raw data. Therefore, in sizing resources needed for the systems and methods, consideration may be given to the lowest level raw data.

As described previously the systems and methods can be conveniently scaled-up. Consumer-providers can publish analysis, which can reduce an amount of data used in other analysis. A reduction in data can mean that as a number of information providers increases, a host computing system may have capacity to deal with increased volumes of data. Furthermore, there is not necessarily a single data broker within a system or cluster of computing systems. For example, the data broker may be a cloud of data brokers rather than just a single process. The data broker(s) may be partitioned and/or scaled up in a similar manner as network servers are known to be scaled and/or partitioned. Information providers can be partitioned and use a particular instance of a data broker. Results provided by an information consumer performing analysis can be provided to the same data broker from which the source data was retrieved or to a different data broker. In one aspect, a data broker may even act as an information consumer to another data broker.

As data reduction occurs at higher levels of analysis, multiple data brokers may "fan-in" or distribute a subset of data to a single data broker. This fan-in means that an information consumer can receive a merged set of data from the single data broker, where the merged set of data was previously collected from other data brokers. Conversely, as necessary, a single data broker can provide a set of data to a set of data brokers. This "fan-out" means that a set of data can be partitioned differently from any partitioning of raw data. Fan-in and fan-out of data can use similar mechanisms described above. Namely, a data broker can subscribe to a set of data from other data brokers in the same manner as information consumers subscribe to a set of data.

The systems and methods provided herein provide various beneficial results, some of which have been described above and will be described below. A simplified programming model can be created where each component handles a small piece of an overall puzzle in an independent manner and where lower-level analysis does not have to be duplicated in higher-level analysis functions. A very extensible programming model can be created where all functions do not need to be known up front. In other words, information consumers may be added or removed without affecting functioning of the system. New forms of data can be introduced without a retooling of functions to accommodate the new forms of data. Configuration changes can be handled dynamically through the provider-consumer subscription model. The architecture can be platform-independent. In fact, the system may be on any number of similar or different local or remote platforms. A flow does not have to be deployed as a unit and operators, or consumers/providers, can be added or removed without retooling an entire flow. The operators can dynamically subscribe to multiple kinds of data and can dynamically decide to publish multiple kinds of data. For example, an operator may be configured to dynamically subscribe to command statistics when certain data has (or has not) been received by the operator.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A computing system comprising:
a data broker having a processor and configured to distribute received data to information consumers subscribed with the data broker for the received data, the information consumers comprising a first information consumer, a second information consumer, and an execution consumer, the first information consumer comprising a problem analysis consumer, and the second information consumer comprising an automation consumer, wherein the data broker has an interface to:
receive first data from a subsystem,
send the first data to the first information consumer subscribed with the data broker for the first data,
receive an analysis result that is based on an analysis of the first data by the first information consumer, the analysis result identifying a repair action to repair a problem with the subsystem,
send the analysis result to the second information consumer subscribed with the data broker for data including the analysis result,
receive, from the second information consumer, an executable instruction to execute the repair, and
send the executable instruction to the execution consumer causing execution of the repair by the execution consumer,
wherein the data broker comprises a notification module configured to notify the first information consumer to not send the analysis result to the data broker if the second information consumer is not subscribed to the data including the analysis result.

2. The computing system of claim 1, wherein the analysis result is represented in a same format as the first data.

3. The computing system of claim 1, wherein the data broker is configured to signal loss of data to the first information consumer to allow the first information consumer to ignore the data loss or to directly query a subsystem for the lost data.

4. The computing system of claim 1, wherein the data broker is to interact with the first information consumer for the first information consumer to dynamically subscribe and unsubscribe to data from the data broker.

5. The computing system of claim 1, wherein the computing system is modular in that the data broker and the information consumers are addable and removable without reconfiguration of existing components of the computing system.

6. The computing system of claim 1, wherein the data broker comprises a cloud of data brokers.

7. The computing system of claim 1, wherein the data broker is to communicate via a messaging layer with the information consumers such that the data broker and information consumers are platform independent.

8. The computing system of claim 1, wherein the data broker is to receive subscription from the first information consumer for different kinds of data provided by different subsystems.

9. The computing system of claim 1, wherein the data broker is configured to send the first data to the first information consumer without the first information consumer specifically requesting the first data from the data broker, and the data broker is configured to send the analysis result to the second information consumer without the second information consumer specifically requesting the analysis result from the data broker.

10. The computing system of claim 1, wherein the data broker is to further receive, from the execution consumer, information relating to a result of the execution of the repair.

11. The computing system of claim 1, wherein the execution consumer is subscribed with the data broker for data including the executable instruction.

12. The computing system of claim 10, wherein the data broker is to distribute the information relating to the result of the execution of the repair to a user interface consumer to cause display of the information relating to the result of the execution of the repair at a user display device.

13. A method comprising:
receiving, by a data broker having a processor, data from a subsystem;
distributing, by the data broker, the data to a first information consumer that has registered with the data broker for the data, the first information consumer comprising a problem analysis consumer;
receiving, by the data broker, an analysis result produced by the first information consumer based on analyzing the data, the analysis result identifying a repair action to repair a problem with the subsystem;

sending, by the data broker, the analysis result to a second information consumer if the second information consumer is registered with the data broker for data including the analysis result, the second information consumer comprising an automation consumer;

receiving, by the data broker from the second information consumer, an executable instruction to execute the repair;

sending, by the data broker, the executable instruction to a third information consumer that causes execution of the repair by the third information consumer, the third information consumer registered with the data broker for data including the executable instruction;

determining, by the data broker, whether any information consumer is registered with the data broker for data including a result of the execution of the repair; and in response to determining that there is no information consumer registered with the data broker for data including the result of the execution of the repair, notifying, by the data broker, the third information consumer to not send the result of the execution of the repair to the data broker.

14. The method of claim 13, wherein the data received from the subsystem comprises raw data, the method further comprising representing the analysis result in a same format as the raw data.

15. The method of claim 13, further comprising, in response to determining that an information consumer is registered with the data broker for the data including the result of the execution of the repair, receiving, by the data broker from the third information consumer, the data including the result of the execution of the repair.

16. A method comprising:

receiving, by a data broker including a processor, data from a subsystem;

distributing, by the data broker, the data to a first information consumer that has a first subscription with the data broker for the data, the first information consumer comprising a problem analysis consumer;

receiving, by the data broker, an analysis result produced by the first information consumer based on analyzing the data, the analysis result identifying a repair action to repair a problem with the subsystem;

sending, by the data broker, the analysis result to a second information consumer that has a second subscription with the data broker for data including the analysis result, the second information consumer comprising an automation consumer;

receiving, by the data broker from the second information consumer, an executable instruction to execute the repair;

sending, by the data broker, the executable instruction to an execution consumer that has a third subscription with the data broker;

executing, by the execution consumer, the executable instruction to execute the repair of the problem;

determining, by the data broker, whether any information consumer has a subscription with the data broker for data including a result of the execution of the repair; and in response to determining that there is no information consumer having a subscription with the data broker for data including the result of the execution of the repair, notifying, by the data broker, the execution consumer to not send the result of the execution of the repair to the data broker.

17. The method of claim 16, further comprising:

receiving, by the data broker, additional data from the subsystem;

sending, by the data broker, the additional data to the first information consumer based on the first subscription;

receiving, by the data broker, an additional analysis result produced by the first information consumer based on analyzing the additional data; and sending, by the data broker, the additional analysis result to the second information consumer based on the second subscription.

18. The method of claim 16, further comprising, in response to determining that an information consumer has a subscription with the data broker for the data including the result of the execution of the repair, receiving, by the data broker from the execution consumer, the data including the result of the execution of the repair.

* * * * *